(12) United States Patent
Feuerstack et al.

(10) Patent No.: US 9,312,692 B2
(45) Date of Patent: Apr. 12, 2016

(54) SYSTEM FOR CHARGING AN ENERGY STORE, AND METHOD FOR OPERATING THE CHARGING SYSTEM

(75) Inventors: Peter Feuerstack, Ludwigsburg (DE); Erik Weissenborn, Stuttgart (DE); Martin Kessler, Schwaebisch Gmuend (DE)

(73) Assignee: ROBERT BOSCH GMBH, Stuttgart (DE)

( * ) Notice: Subject to any disclaimer, the term of this patent is extended or adjusted under 35 U.S.C. 154(b) by 353 days.

(21) Appl. No.: 13/824,753

(22) PCT Filed: Aug. 25, 2011

(86) PCT No.: PCT/EP2011/064636
§ 371 (c)(1),
(2), (4) Date: Jun. 4, 2013

(87) PCT Pub. No.: WO2012/038186
PCT Pub. Date: Mar. 29, 2012

(65) Prior Publication Data
US 2013/0249287 A1    Sep. 26, 2013

(30) Foreign Application Priority Data
Sep. 20, 2010   (DE) .......................... 10 2010 041 065

(51) Int. Cl.
*H02J 1/00* (2006.01)
*B60L 11/18* (2006.01)
(Continued)

(52) U.S. Cl.
CPC ............... *H02J 1/00* (2013.01); *B60L 11/1853* (2013.01); *B60L 11/1864* (2013.01);
(Continued)

(58) Field of Classification Search
CPC ........................................................ H02J 1/00
USPC ........................................................ 307/20
See application file for complete search history.

(56) References Cited

U.S. PATENT DOCUMENTS 5,642,275 A    6/1997  Peng et al.
5,960,898 A *  10/1999 Okada et al. ................. 180/65.8
(Continued)

FOREIGN PATENT DOCUMENTS

CN    1201563    12/1998
CN    1993246    7/2007
(Continued)

OTHER PUBLICATIONS

International Search Report for PCT/EP2011/064636, dated Jul. 26, 2012.

*Primary Examiner* — Jared Fureman
*Assistant Examiner* — Daniel Kessie
(74) *Attorney, Agent, or Firm* — Kenyon & Kenyon LLP

(57) ABSTRACT

An energy supply network has an n-phase electrical machine where n≥1 and a controllable first energy reservoir which serves to control and supply electrical energy to the electrical machine. The first energy reservoir has n parallel energy supply branches that each have at least two energy reservoir modules, connected in series, that each encompass at least one electrical energy reservoir cell having an associated controllable coupling unit and are connected on the one hand to a reference bus, and on the other hand to a respective phase of the electrical machine. As a function of control signals, the coupling units either bypass the respectively associated energy reservoir cells or switch the respectively associated energy reservoir cells into the energy supply branch.

9 Claims, 6 Drawing Sheets

(51) Int. Cl.
*H02J 7/00* (2006.01)
*H02J 7/14* (2006.01)
*H02P 27/14* (2006.01)

(52) U.S. Cl.
CPC .......... *B60L 11/1866* (2013.01); *H02J 7/0014* (2013.01); *H02J 7/0024* (2013.01); *H02J 7/0055* (2013.01); *H02J 7/1492* (2013.01); *H02P 27/14* (2013.01); *H02J 2007/0059* (2013.01); *H02J 2007/0067* (2013.01); *Y02E 10/766* (2013.01); *Y02T 10/642* (2013.01); *Y02T 10/7005* (2013.01); *Y02T 10/7055* (2013.01); *Y02T 10/7061* (2013.01); *Y02T 10/92* (2013.01); *Y10T 307/313* (2015.04); *Y10T 307/32* (2015.04)

(56) References Cited

U.S. PATENT DOCUMENTS

| | | | |
|---|---|---|---|
| 6,058,032 A | | 5/2000 | Yamanaka et al. |
| 8,698,351 B2 * | | 4/2014 | Castelaz et al. ............. 307/25 |
| 2007/0080662 A1 * | | 4/2007 | Wu .......................... 320/110 |
| 2007/0246943 A1 * | | 10/2007 | Chang et al. ................. 290/44 |

FOREIGN PATENT DOCUMENTS

| | | |
|---|---|---|
| CN | 101254757 | 9/2008 |
| DE | 101 03 031 | 7/2002 |
| DE | 10 2010 027 857 | 4/2010 |
| DE | 10 2010 027 861 | 10/2011 |

* cited by examiner

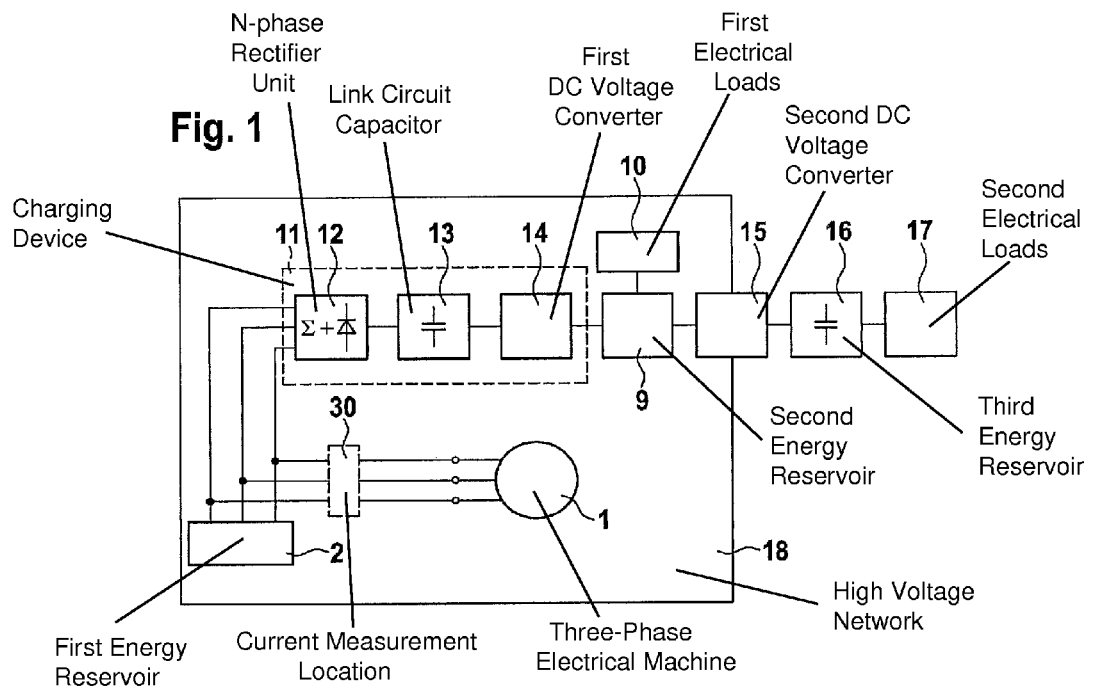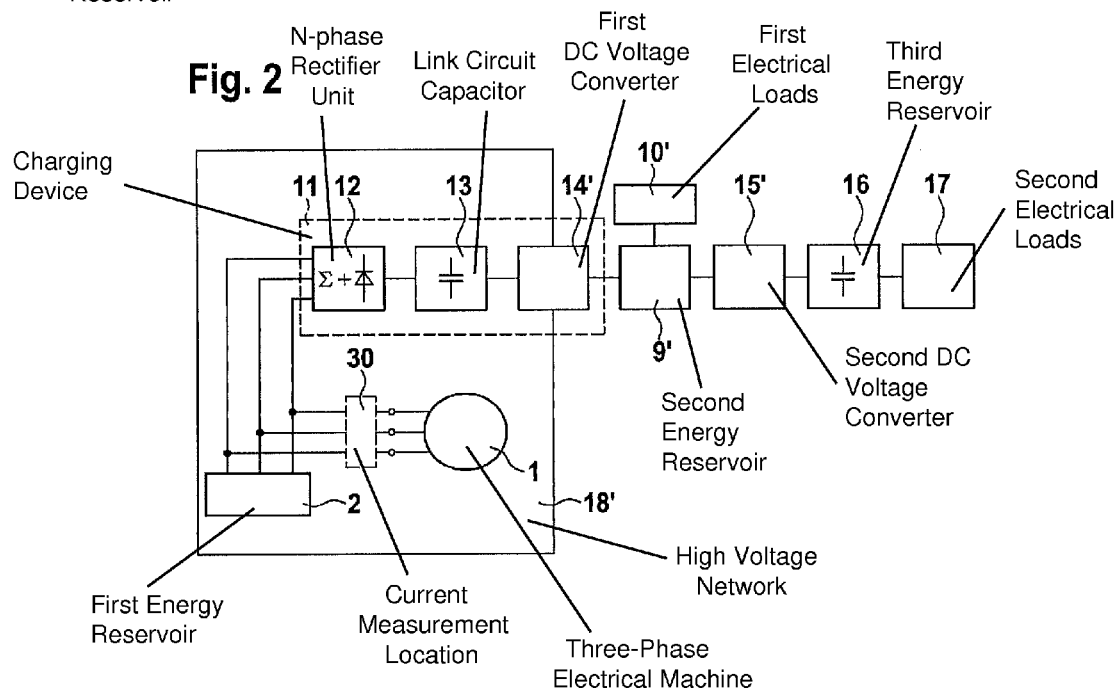

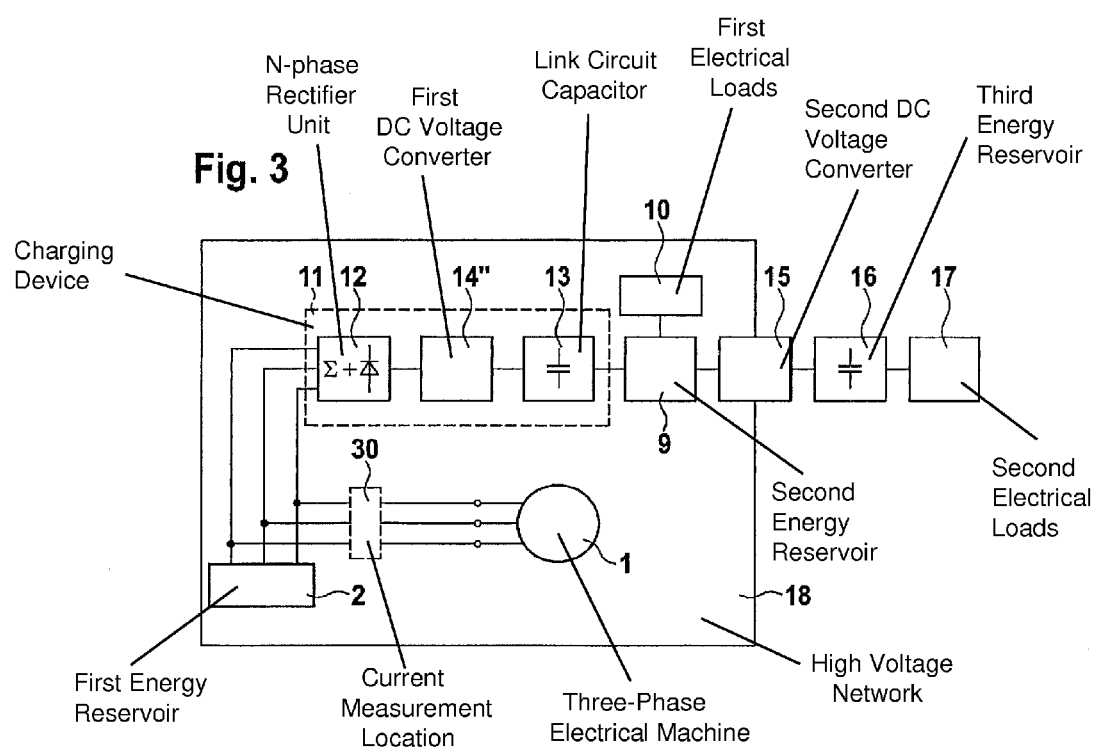

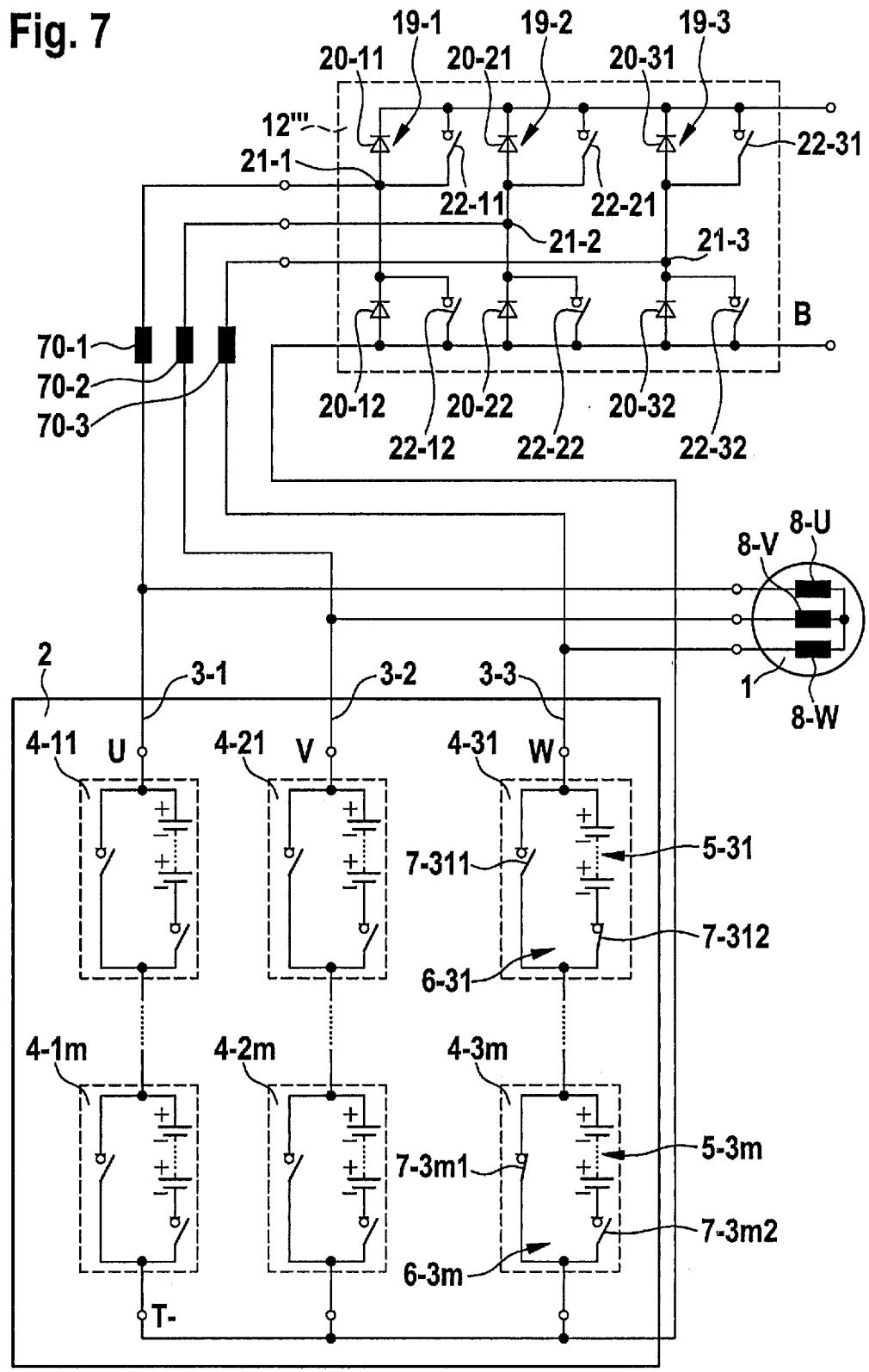

SYSTEM FOR CHARGING AN ENERGY STORE, AND METHOD FOR OPERATING THE CHARGING SYSTEM

BACKGROUND OF THE INVENTION

1. Field of the Invention

The present invention relates to a system for charging an energy reservoir, and to a method for operating the charging system.

2. Description of the Related Art

It is becoming apparent that in the future, both for stationary applications such as wind power installations and in vehicles such as hybrid or electric vehicles, increasing use will be made of electronic systems that combine new energy storage technologies with electrical drive technology. In conventional applications an electrical machine, which is embodied e.g. as a phase-sequence machine, is controlled via a converter in the form of an inverter. A characteristic of such systems is a so-called DC link circuit through which an energy reservoir, usually a battery, is connected to the DC voltage side of the inverter. In order to be able to meet the demands of a particular application in terms of power output and energy, multiple battery cells are connected in series. Because the current furnished by an energy reservoir of this kind must flow through all the battery cells, and because a battery cell can conduct only a limited current, battery cells are often additionally connected in parallel in order to increase the maximum current.

A series circuit of multiple battery cells yields not only a high total voltage but also the problem that the entire energy reservoir fails if a single battery cell fails, since battery current can then no longer flow. Such a failure of the energy reservoir can result in failure of the entire system. In a vehicle, a failure of the drive battery can leave the vehicle "stranded." In other applications, for example rotor blade adjustment of wind power installations, unfavorable boundary conditions such as, for example, high wind can in fact lead to hazardous situations. A high level of reliability of the energy reservoir is therefore always desirable, "reliability" referring to the ability of a system to operate in fault-free fashion for a predetermined time.

German Patent Applications DE 10 2010 027857 and DE 10 2010 027861 describe batteries having multiple battery module sections that are connectable directly to an electrical machine. The battery module sections have a plurality of battery modules connected in series, each battery module having at least one battery cell and an associated controllable coupling unit that makes it possible, as a function of control signals, to interrupt the respective battery module section or bypass the respectively associated at least one battery cell or switch the respectively associated at least one battery cell into the respective battery module section. By appropriate application of control to the coupling units, e.g. with the aid of pulse width modulation, it is also possible to furnish suitable phase signals in order to control the electrical machine, so that a separate pulse width modulated inverter can be omitted. The pulse width modulated inverter required in order to control the electrical machine is thus, so to speak, integrated into the battery. For purposes of disclosure, these two earlier Applications are incorporated in their entirety into the present Application.

In contrast to conventional systems in which an electrical machine is controlled via an inverter and is supplied with electrical energy by an electrical energy reservoir separate therefrom, a constant DC voltage is not available in the case of the batteries described in the German Applications DE 10 2010 027857 and DE 10 2010 027861, so that such batteries cannot readily be integrated into conventional energy supply networks such as, for example, vehicle electrical systems of an electric or hybrid vehicle.

BRIEF SUMMARY OF THE INVENTION

The present invention creates an energy supply network that has a controllable first energy reservoir which serves to control and supply electrical energy to an n-phase electrical machine where $n \geq 1$. The first energy reservoir has n parallel energy supply branches that each have at least two energy reservoir modules, connected in series, that each encompass at least one electrical energy reservoir cell having an associated controllable coupling unit. The energy supply branches are connectable on the one hand to a reference potential (hereinafter referred to as a "reference bus") and on the other hand to a respective phase of the electrical machine, As a function of control signals, the coupling units either bypass the respectively associated energy reservoir cells or switch the respectively associated energy reservoir cells into the energy supply branch. The energy supply network furthermore has a second energy reservoir from which electrical loads are supplyable with DC voltage, and a charging device for the second energy reservoir, which charging device is connectable on the input side to the energy supply branches of the first energy reservoir and to the phases of the electrical machine, and on the output side to the second energy reservoir.

During motor-mode operation of the electrical machine, the controllable first energy reservoir furnishes at the output side an alternating voltage for applying control to the electrical machine. In contrast to conventional systems, however, in which an electrical machine is controlled via an inverter and is supplied with electrical energy by an electrical energy reservoir separate therefrom, no DC voltage is available for supplying energy directly to electrical loads such as, for example, high-voltage loads in a vehicle electrical system, or as an input variable for a DC voltage converter.

The invention is based on the fundamental idea of providing a second energy reservoir from which electrical loads are supplyable with DC voltage and which is charged by the controllable first energy reservoir. The DC voltage necessary for supplying electrical loads can thus be generated with relatively little hardware outlay.

According to an embodiment, the charging device encompasses an n-phase rectifier unit that encompasses n parallel rectifier branches which are each connectable to an energy supply branch and to the associated phase of the electrical machine, a link circuit capacitor that is downstream from the rectifier unit and is fed from it, and a first DC voltage converter that is downstream from the link circuit capacitor and adapts a first voltage level of the link circuit capacitor to a second voltage level of the second energy reservoir.

During motor-mode operation of the electrical machine, approximately sinusoidal output currents are available at the output of the controllable first energy reservoir, which currents are phase-shifted in the case of a multi-phase electrical machine. These are used, with the assistance of a rectifier whose number of phases corresponds to the number of phases of the electrical machine, to feed into a link circuit capacitor. The voltage level of the rectified voltage varies as a function of a presently set space vector of the electrical machine, and as a function of the control application behavior of the coupling units. A DC voltage converter—often also referred to as a DC/DC converter—downstream from the link circuit capacitor therefore adapts the resulting first voltage level of the first link circuit capacitor to the second, desired voltage level of the second energy reservoir. This voltage level can be both above the voltage level of the link circuit capacitor (step-up behavior) and below the voltage level of the first link circuit capacitor (step-down behavior).

According to an alternative embodiment of the invention, the charging device encompasses an n-phase rectifier unit that encompasses n parallel rectifier branches which are each connectable to an energy supply branch and to the associated phase of the electrical machine, a first DC voltage converter that is downstream from the rectifier unit, adapts a first voltage level of the rectified voltage to a second voltage level of the second energy reservoir, and controls an energy flux out of the controllable energy reservoir during operation of the electrical machine in such a way that a constant power output is taken off, and a link circuit capacitor that is downstream from the first DC voltage converter and is fed from it.

In such an assemblage, the first DC voltage converter—which can be embodied, depending on the application, as a step-up converter, step-down converter, or even as a step-up/down converter, e.g. in the form of an inverse converter—can control the energy flux out of the controllable energy reservoir in such a way that a constant power output is taken off. The result of this is that the voltage at the link circuit capacitor no longer fluctuates, and can be selected optimally for the specific application. In addition, no phases without current flow occur, so that sufficient buffering can be achieved even with a link circuit capacitor of comparatively small dimensions.

According to a further embodiment of the invention, the energy supply network additionally has a second DC voltage converter that is downstream from the second energy reservoir and adapts the second voltage level of the second energy reservoir to a third voltage level of a third energy reservoir downstream from the second DC voltage converter. Electrical loads can then be supplied, from the third energy reservoir, with a DC voltage at the third voltage level.

This allows a dual-voltage energy supply network to be realized, in which context the voltage level of the second energy reservoir is held relatively constant by a battery management system so that the second DC voltage converter can be designed for a narrow range of input and output voltages and thus with a single stage, resulting in reduced hardware outlay.

According to an embodiment, the second energy reservoir is a high-voltage energy reservoir. The first DC voltage converter is consequently embodied without galvanic isolation.

If the third energy reservoir is embodied, conversely, as a low- or medium-voltage energy reservoir, the second DC voltage converter is then, according to an embodiment of the invention, embodied with galvanic isolation.

Lastly, the first DC voltage converter can also be embodied with galvanic isolation, and the second energy reservoir can be embodied as a low- or medium-voltage energy reservoir. If the second energy reservoir is designed for a voltage≤60 V, this then has the advantage that no additional safeguarding measures, for example regarding shock hazard protection, need to be taken; this yields cost savings. A prerequisite is of course that none of the electrical loads requires a higher operating voltage level.

The rectifier unit can be configured as a bridge rectifier. According to an embodiment of the invention, however, provision is made that the reference bus of the controllable energy reservoir is connectable to a reference bus of the charging device. In this case, especially if the coupling units have switch elements in a half-bridge configuration, the rectifier unit can also be configured as an n-pulse rectifier.

N-pulse rectifiers, which for n=1 are also often referred to as half-wave rectifiers, have n parallel rectifier branches each having a diode or another switch element. Only the positive or negative half-oscillation is therefore used, but this has no negative consequences when utilizing coupling units having switch elements in a half-bridge configuration. If the coupling units have switch elements in a full-bridge configuration, the result of the embodiment as an N-pulse rectifier is that the voltage in the link circuit is correspondingly lower than when a bridge rectifier is used. The lesser hardware requirement is, however, advantageous.

Regardless of whether a bridge rectifier or N-pulse rectifier is used, the connection between the reference bus of the controllable energy reservoir and the reference bus of the charging device has the advantage that with this configuration, the link circuit of the energy supply network can be provided with voltage even when the electrical machine is at a standstill. An identical DC voltage can thus be established in each energy supply branch of the controllable first energy reservoir, and fed directly into the link circuit. The voltage in each energy supply branch is advantageously regulated in order to avoid compensating currents in the electrical machine.

According to a further embodiment of the invention, the rectifier unit can also be embodied as a bidirectional rectifier. Bidirectional operation of a rectifier can be achieved either by the fact that controllable switch elements are inserted parallel to the diodes of a diode rectifier, or also by the fact that the diodes are entirely replaced by controllable switch element. The use of bidirectional rectifiers offers the advantage that the energy supply cells of the controllable first energy reservoir can then also be charged by way of the second energy reservoir.

If the rectifier unit is configured as a bidirectional bridge rectifier, it is then advantageous to provide respective additional inductances between the charging device and respectively the energy supply branches of the first energy reservoir and the phases of the electrical machine, so as thereby to implement a step-up function that permits charging of the DC voltage link circuit while the electrical machine is active, if the voltage level of the link circuit is above the voltage level of the controllable energy reservoir.

BRIEF DESCRIPTION OF THE DRAWINGS

FIG. 1 is a schematic block diagram of a first embodiment of an energy supply network according to the present invention.

FIG. 2 is a schematic block diagram of a second embodiment of an energy supply network according to the present invention.

FIG. 3 is a schematic block diagram of a third embodiment of an energy supply network according to the present invention.

FIG. 7 schematically depicts a controllable energy reservoir including its attachment to an electrical machine and to a rectifier unit, according to a further alternative embodiment, with a bidirectional configuration of the rectifier unit.

DETAILED DESCRIPTION OF THE INVENTION

Figure 4:
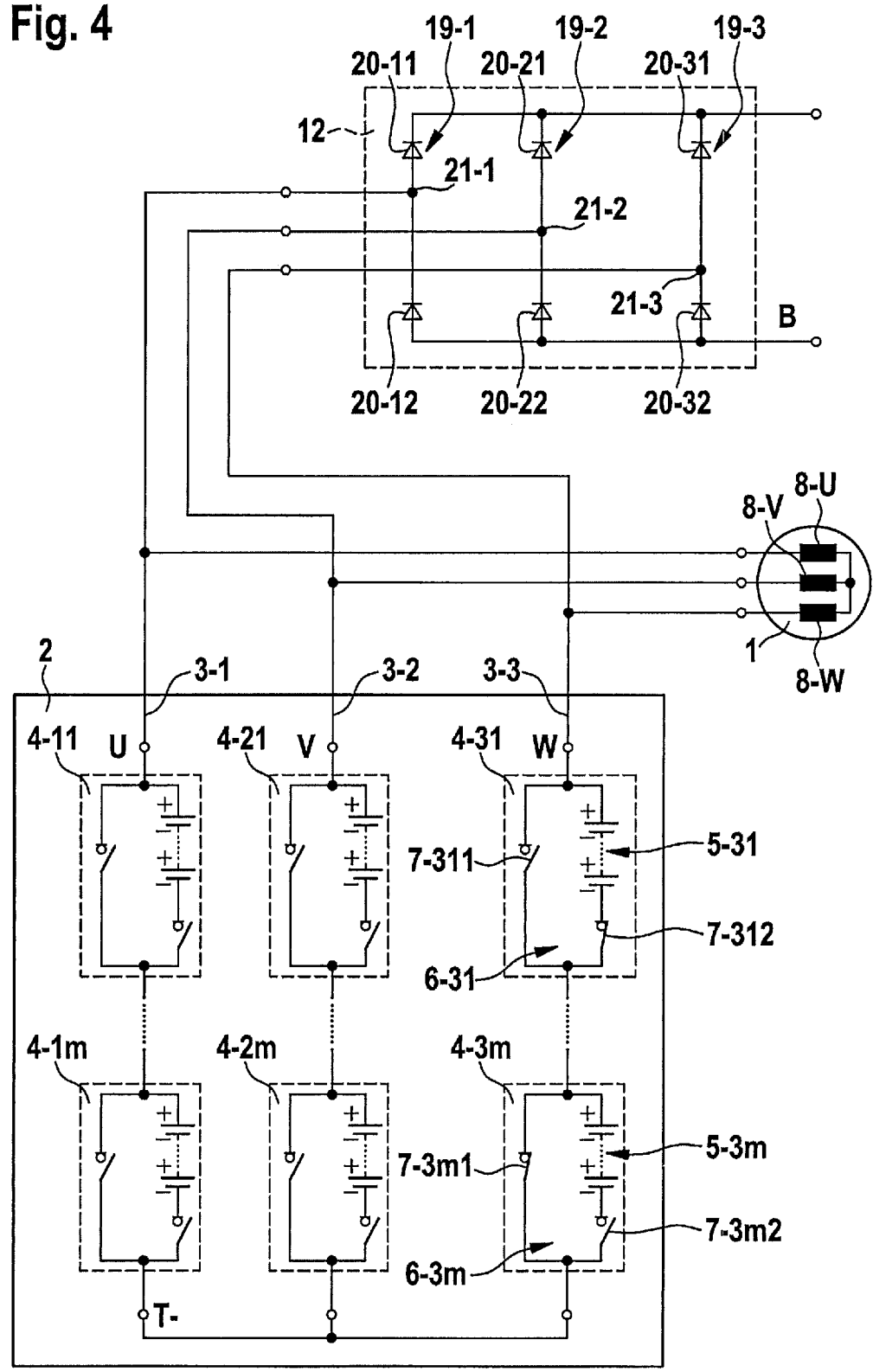
FIG. 4 schematically depicts a controllable energy reservoir including its attachment to an electrical machine and to a rectifier unit.

FIG. 1 is a schematic block diagram of a first embodiment of an energy supply network according to the present invention. A controllable energy reservoir 2 is connected to a three-phase electrical machine 1. Controllable energy reservoir 2 encompasses three energy supply branches 3-1, 3-2, and 3-3, which are connected on the one hand to a low reference potential T- (reference bus) and on the other hand respectively to individual phases U, V, W of electrical machine 1 (see FIGS. 4, 5, 6, 7). Each of energy supply branches 3-1, 3-2, and 3-3 has, connected in series, m energy reservoir modules 4-11 to 4-1$m$, 4-21 to 4-2$m$, and 4-31 to 4-3$m$ respectively, where m≥2. Energy reservoir modules 4 in turn each encompass multiple electrical energy reservoir cells connected in series which, for reasons of clarity, are labeled in FIGS. 4 to 7 only in energy supply branch 3-3 connected to phase W of electrical machine 1, with reference characters 5-31 to 5-3$m$. Energy reservoir modules 4 furthermore each encompass a coupling unit that is associated with energy reservoir cells 5 of the respective energy reservoir module 4. For reasons of clarity, the coupling units too are labeled only in energy supply branch 3-3, with reference characters 6-31 to 6-3$m$. In the variant embodiment depicted in FIGS. 4 to 7, coupling units 6 are each constituted by two controllable switch elements 7-311 and 7-312 to 7-3$m$1 and 7-3$m$2. The switch elements can be embodied as power semiconductor switches, e.g. in the form of insulated gate bipolar transistors (IGBTs) or as metal oxide semiconductor field-effect transistors (MOSFETs).

Coupling units 6 make it possible to interrupt the respective energy supply branch 3 by opening both switch elements 7 of a coupling unit 6. Alternatively, energy reservoir cells 5 either can be bypassed by closing one of the respective switch elements 7 of a coupling unit 6, for example by closing switch 7-311, or can be switched into the respective energy supply branch 3, for example by closing switch 7-312.

The total output voltages of energy supply branches 3-1 to 3-3 are determined by the respective switching state of the controllable switch elements 7 of coupling units 6, and can be adjusted in steps. The steps occur as a function of the voltage of the individual energy reservoir modules 4. Proceeding from the preferred embodiment of identically configured energy reservoir modules 4, what results then as a maximum possible total output voltage is the voltage of an individual energy reservoir module 4 times the number m of energy reservoir modules 4 connected in series in each energy supply branch.

Coupling units 6 thus make it possible to switch phases U, V, W of electrical machine 1 toward either a high reference potential or a low reference potential, and can in that regard also perform the function of a known inverter. The power output and operating mode of electrical machine 1 can thus be controlled, with appropriate application of control to coupling units 6, by controllable energy reservoir 2. Controllable energy reservoir 2 thus performs a dual function in this regard, since it serves not only to supply electrical energy to electrical machine 1 but also to control it.

Electrical machine 1 has stator windings 8-U, 8-V and 8-W that, in the exemplifying embodiment depicted, are interconnected with one another in a star configuration.

In the exemplifying embodiment depicted, electrical machine 1 is embodied as a three-phase rotary current machine, but it can also have fewer or more than three phases.

The number of phases of the electrical machine of course also governs the number of energy supply branches 3 in controllable energy reservoir 2.

In the exemplifying embodiment depicted, each energy reservoir module 4 has multiple respective energy reservoir cells 5 connected in series. Energy reservoir modules 4 can, however, alternatively also have only a single energy reservoir cell or also energy reservoir cells connected in parallel.

In the exemplifying embodiment depicted, coupling units 6 are each constituted by two controllable switch elements 7. Coupling units 6 can, however, also be realized using more or fewer controllable switch elements, provided the necessary functions (bypassing of the energy supply cells, and switching of the energy supply cells into the energy supply branch) can be realized. Examples of alternative embodiments of a coupling unit are evident from the German Applications DE 10 2010 027857 and DE 10 2010 027861. It is moreover also conceivable, however, for the coupling elements to have switch elements in a full bridge configuration, which offers the additional capability of a voltage reversal at the output of the energy reservoir module.

During motor-mode operation of electrical machine 1, controllable first energy reservoir 2 furnishes at the output side an alternating voltage for applying control to electrical machine 1. In contrast to conventional systems, however, in which an electrical machine is controlled via an inverter and is supplied with electrical energy by an electrical energy reservoir separate therefrom, no DC voltage is available for supplying energy directly to electrical loads such as, for example, high-voltage loads in a vehicle electrical system, or as an input variable for a DC voltage converter.

A second energy reservoir 9 is therefore provided, from which first electrical loads 10 are supplyable with DC voltage and which is charged via a charging device 11 by controllable first energy reservoir 1. Charging device 11 is connected for that purpose on the input side to energy supply branches 3-1, 3-2, and 3-3 of first energy reservoir 2 and to phases U, V, W of electrical machine 1, and on the output side to second energy reservoir 9.

Charging device 11 encompasses an n-phase rectifier unit 12 that encompasses n parallel rectifier branches that are each connected to a respective energy supply branch 3-1, 3-2, 3-3 of controllable first energy reservoir 2 and to the respectively associated phase U, V, W of electrical machine 1. Charging device 11 furthermore has a link circuit capacitor 13 that is downstream from rectifier unit 12 and is fed from it. The voltage level of the rectified voltage varies as a function of a presently set space vector of electrical machine 1. A first DC voltage converter 14 is therefore provided, which is downstream from the link circuit capacitor and adapts a first voltage level of link circuit capacitor 13 to a second voltage level of second energy reservoir 9.

In accordance with the embodiment of the invention depicted in FIG. 1, second energy reservoir 9 is embodied as a high-voltage energy reservoir, e.g. in the form of a high-voltage battery, and first DC voltage converter 14 is correspondingly embodied without galvanic isolation.

A second DC voltage converter 15, downstream from second energy reservoir 9, is provided in order to adapt the second voltage level of second energy reservoir 9 to a third voltage level of a third energy reservoir 16 downstream from second DC voltage converter 15. Second electrical loads 17 are supplyable with a DC voltage at the third voltage level from third energy reservoir 16, which in the exemplifying embodiment depicted in FIG. 1 is embodied as a low- or medium-voltage energy reservoir, for example in the form of a battery or a supercap. Because second DC voltage converter 15 produces a lowering of the voltage level from a high-voltage range into a low- or medium-voltage range, and thus, so to speak, terminates a high-voltage network 18, it is embodied with galvanic isolation.

If the phase currents of the electrical machine are to be measured in order to regulate electrical machine 1, care must be taken that current measurement occurs only after the tapping point of charging device 11. This is indicated in FIG. 1 by a block having the reference character 30.

FIG. 2 shows an alternative embodiment of an energy supply network according to the present invention. This differs from the embodiment depicted in FIG. 2 in that a second energy reservoir 9' is embodied not as a high-voltage energy reservoir but instead as a medium-voltage energy reservoir, from which first electrical loads 10' are supplyable with DC voltage. A first DC voltage converter 14' therefore already terminates a high-voltage network 18' and is consequently embodied with galvanic isolation. A second DC voltage converter 15', which is downstream from second energy reservoir 9' and which adapts the second voltage level of second energy reservoir 9' to the third voltage level of third energy reservoir 16, can consequently be embodied without galvanic isolation.

FIG. 3 shows a further alternative embodiment of an energy supply network according to the present invention. This differs from the embodiment depicted in FIG. 2 in that a first DC voltage converter 14" is located not downstream but rather upstream from link circuit capacitor 13. In this fashion, the energy flux out of controllable energy reservoir 2 during operation of electrical machine 1 can be controlled in such a way that a constant power output is taken off. In FIG. 3, second energy reservoir 9 is depicted, analogously to FIG. 1, as a high-voltage energy reservoir. The configuration of the charging device according to FIG. 3 is, however, of course also combinable with other energy reservoirs, for example a medium-voltage energy reservoir according to FIG. 2.

FIGS. 1, 2, and 3 each depict dual-voltage energy supply networks, i.e. energy supply networks that can supply electrical loads with energy at two voltage levels. Dual-voltage energy supply networks of this kind are often used, for example, in the motor vehicle sector, where they are referred to as dual-voltage vehicle electrical systems. If a link circuit having a single voltage level is sufficient for a specific application, since all the electrical loads can be operated at that voltage level, then second DC voltage converter 15 and third energy reservoir 16 can of course be omitted. First DC voltage converter 14 is then embodied with or with galvanic isolation depending on whether the second energy reservoir is a high-voltage reservoir or a low-/medium-voltage reservoir.

FIG. 4 is a schematic depiction of controllable energy reservoir 2 including its attachment to electrical machine 1 and to rectifier unit 12. The rectifier unit is designed with three phases, corresponding to the number of phases U, V, W of electrical machine 1 and the number of energy supply branches 3-1, 3-2, and 3-1 of the controllable first energy reservoir. According to the embodiment depicted, the rectifier unit is embodied concretely as a six-pulse diode rectifier in bridge configuration. Each rectifier branch 19-1, 19-2, 19-3, which respectively has two diodes 20-11 and 20-12, 20-21 and 20-22, 20-31 and 20-32, is connected at a respective connection point 21-1, 21-2, 21-3, which is disposed respectively between the two diodes 20 of a rectifier branch 19, to a respective energy supply branch 3-1, 3-2, 3-3 and to the respective associated phase U, V, W of electrical machine 1.

Figure 5:
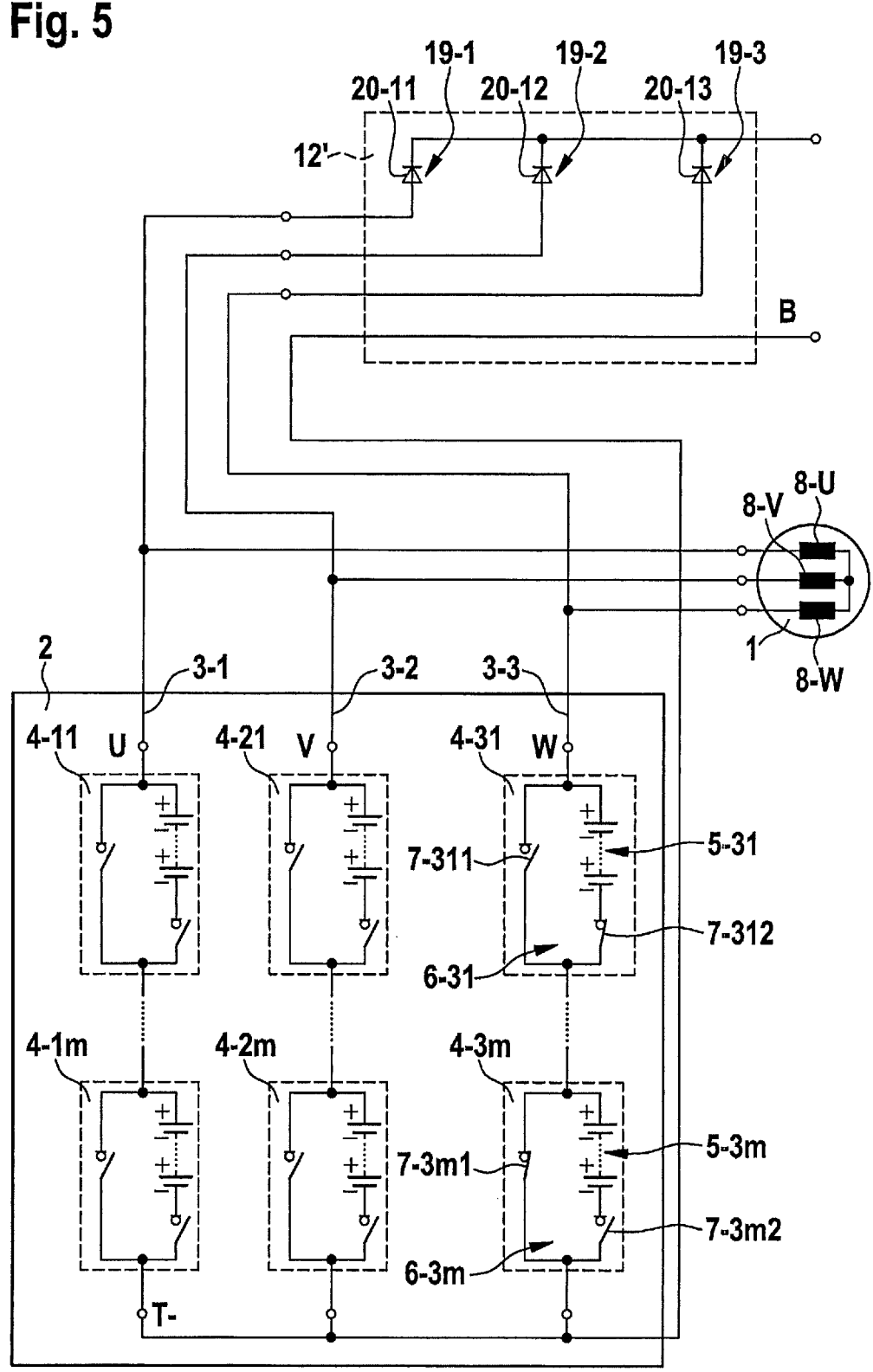
FIG. 5 schematically depicts a controllable energy reservoir including its attachment to an electrical machine and to a rectifier unit, according to an alternative embodiment.

FIG. 5 shows a further embodiment of the attachment of a rectifier unit 12' to electrical machine 1 and to controllable first energy reservoir 2. Here reference bus T- of controllable first energy reservoir 2 is connected to a reference bus B of charging device 11, of which only rectifier unit 12' is depicted, however, in FIG. 5. If coupling units 6, as depicted, have switch elements 7 in a half-bridge configuration, then only positive potentials occur. Rectifier unit 12' can thus be embodied, with no influence on functionality, as a three-pulse rectifier. As compared with rectifier unit 12 according to FIG. 4 embodied as a bridge rectifier, the n-pulse rectifier of rectifier unit 12' no longer has any low-side diodes 20-12, 20-22, and 20-32, but has only high-side diodes 20-11, 20-21, and 20-31.

When the reference buses of controllable first energy reservoir 1 and of charging device 11 are connected, however, the rectifier unit can of course also be embodied as a bridge rectifier; this is useful in particular when coupling units 6 have switch elements 7 in a full-bridge configuration. Otherwise it is necessary to accept that only one half-oscillation can be used.

Figure 6:
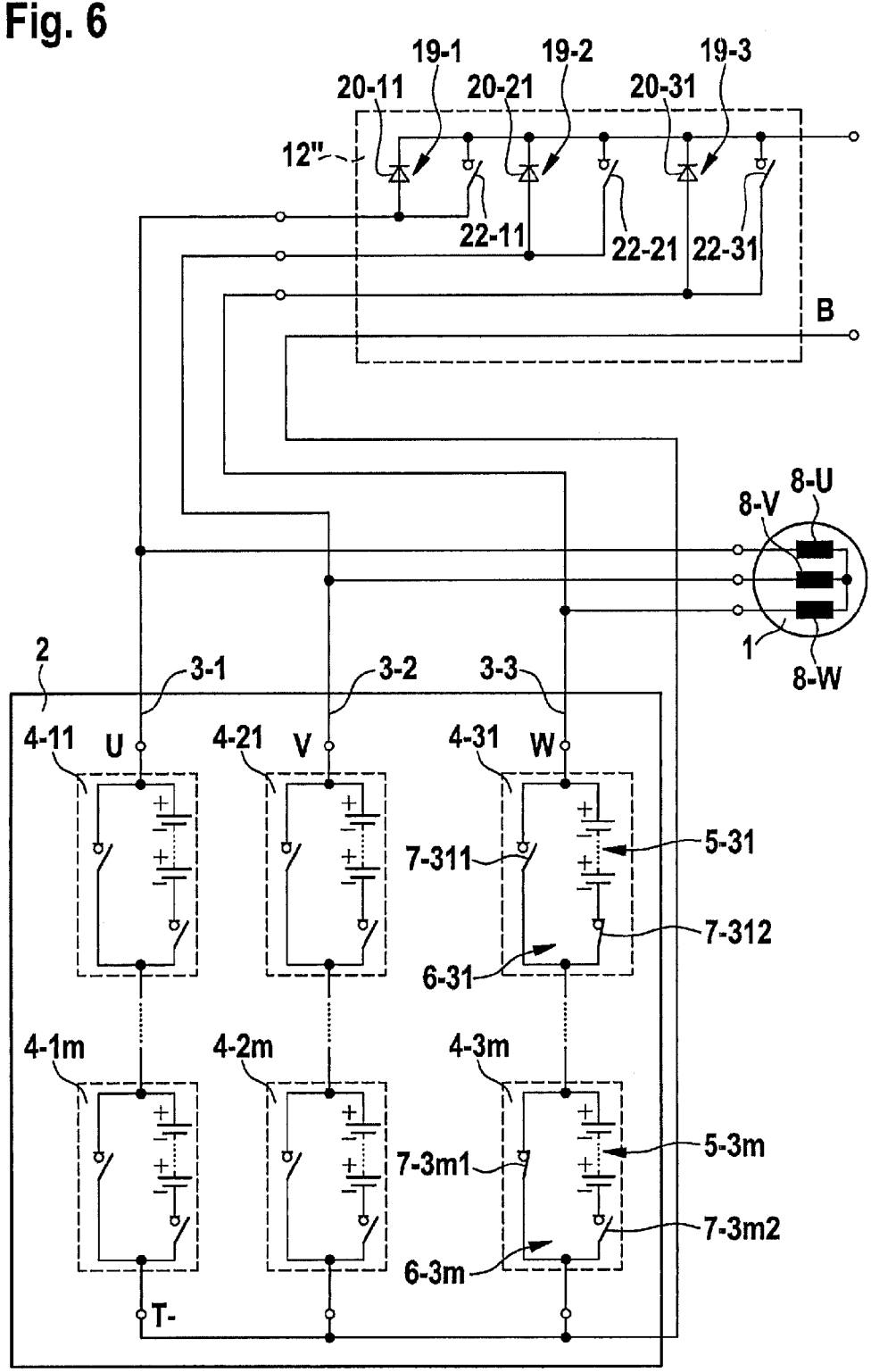
FIG. 6 schematically depicts a controllable energy reservoir including its attachment to an electrical machine and to a rectifier unit, according to the embodiment of FIG. 4, with a bidirectional configuration of the rectifier unit.

Alternatively to the unidirectional rectifier units 12 and 12' depicted in FIGS. 4 and 5, however, the rectifier unit can also be embodied bidirectionally, offering the possibility of charging energy reservoir cells 5 of controllable first energy reservoir 2 using second energy reservoir 9. This type of configuration of a rectifier unit 12" is depicted in FIG. 6. Rectifier unit 12" is configured, analogously to rectifier unit 12' according to FIG. 5, as a three-pulse rectifier having only one respective diode (high-side diode) 20-11, 2-21, and 20-31 per respective rectifier branch 19-1, 19-2, and 19-3. Bidirectionality, i.e. operability in both directions, is achieved by the fact that a respective controllable switch element 22-11, 22-21, 22-31 is inserted in parallel with the respective diodes 20-11, 20-21, and 20-31. Alternatively thereto, diodes 20-11, 20-21, and 20-31 could also be entirely replaced by controllable switch elements.

Bidirectional operation can of course also be enabled in this manner (parallel insertion of controllable switch elements, or replacement of diodes with controllable switch elements) in the context of a bridge rectifier such as the one depicted in FIG. 4.

FIG. 7 shows a particularly advantageous attachment of a rectifier unit 12''', which is embodied as a bidirectional bridge rectifier, to electrical machine 1 and to controllable first energy reservoir 2. Rectifier unit 12''' configured as a bidirectional bridge rectifier has, besides diodes 20-11, 20-12, 20-21, 20-22, 20-31, and 20-32, controllable switch elements 22-11, 22-12, 22-21, 22-22, 22-31, and 22-32 inserted respectively in parallel. Furthermore, respective additional inductances 70-1, 70-2, 70-3 are provided in the connecting leads between electrical machine 1 and controllable electrical energy reservoir 2, and rectifier unit 12'''. An assemblage of this kind allows implementation of a step-up function by controllable energy reservoir 2 in the DC voltage link circuit. The energy flux out of controllable energy reservoir 2 during the operation of electrical machine 1 can also be controlled in such a way that a constant power output is taken off.

What is claimed is:

1. An energy supply network, comprising:
a controllable first energy reservoir which serves to control and supply electrical energy to an n-phase electrical machine, where n≥1, the first energy reservoir having n parallel energy supply branches which (i) each have at least two energy reservoir modules connected in series, each energy reservoir module encompassing at least one electrical energy reservoir cell having an associated controllable coupling unit, (ii) are connectable on the one hand to a reference bus, and (iii) are connectable on the other hand to a respective phase of the electrical machine, wherein, as a function of control signals, the coupling units one of bypass the respectively associated energy reservoir cells or switch the respectively associated energy reservoir cells into the respective energy supply branch;

a second energy reservoir from which electrical loads are supplied with DC voltage; and a charging device for the second energy reservoir, wherein the charging device is connectable (a) on an input side to the energy supply branches of the first energy reservoir and to the phases of the electrical machine, and (b) on an output side to the second energy reservoir, wherein the charging device includes:

an n-phase rectifier unit having n parallel rectifier branches which are each connected to an energy supply branch and to the associated phase of the electrical machine;

a link circuit capacitor downstream from the rectifier unit and fed from the rectifier unit; and a first DC voltage converter which is downstream from the link circuit capacitor and adapts a first voltage level of the link circuit capacitor to a second voltage level of the second energy reservoir, wherein the first DC voltage converter is provided without galvanic isolation, and wherein the second energy reservoir is configured as a high-voltage energy reservoir, a second DC voltage converter which is downstream from the second energy reservoir; and a third energy reservoir downstream from the second DC voltage converter; wherein the second DC voltage converter adapts the second voltage level of the second energy reservoir to a third voltage level of the third energy reservoir downstream from the second DC voltage converter, and wherein electrical loads are supplied with a DC voltage at the third voltage level from the third energy reservoir.

2. The energy supply network as recited in claim 1, wherein the charging device includes:
   an n-phase rectifier unit having n parallel rectifier branches which are each connected to an energy supply branch and to the associated phase of the electrical machine;
   a first DC voltage converter which (i) is downstream from the rectifier unit, (ii) adapts a first voltage level of the rectified voltage to a second voltage level of the second energy reservoir, and (iii) controls an energy flux out of the controllable energy reservoir during operation of the electrical machine in such a way that a constant power output is taken off; and
   a link circuit capacitor downstream from the first DC voltage converter and fed from the first DC voltage converter.

3. The energy supply network as recited in claim 1, wherein the second DC voltage converter is provided with galvanic isolation, and wherein the third energy reservoir is configured as one of a low- or medium-voltage energy reservoir.

4. The energy supply network as recited in claim 1, wherein the first DC voltage converter is provided with galvanic isolation, and wherein the second energy reservoir is configured as one of a low- or medium-voltage energy reservoir.

5. The energy supply network as recited in claim 1, wherein the rectifier unit is configured as a bridge rectifier.

6. The energy supply network as recited in claim 1, wherein the reference bus of the controllable first energy reservoir is connected to a reference bus of the charging device.

7. The energy supply network as recited in claim 6, wherein the rectifier unit of the charging device is configured as an n-pulse rectifier.

8. The energy supply network as recited in claim 7, wherein the rectifier unit is configured as a bidirectional rectifier.

9. The energy supply network as recited in claim 8, wherein: the rectifier unit is configured as a bidirectional bridge rectifier; and respective additional inductances are disposed (i) between the charging device and the energy supply branches of the first energy reservoir, and (ii) between the charging device and the phases of the electrical machine.

* * * * *